United States Patent [19]

Kipnees et al.

[11] Patent Number: 4,980,991
[45] Date of Patent: Jan. 1, 1991

[54] PROTECTIVE WRAPPING

[75] Inventors: Jerome J. Kipnees, Cranbury, N.J.; Lewis R. Raszewski, Stevensville, Md.

[73] Assignee: The Crowell Corporation, Newport, Del.

[21] Appl. No.: 931,215

[22] Filed: Nov. 14, 1986

[51] Int. Cl.$^5$ ............................................. A01G 13/02
[52] U.S. Cl. ............................................. 47/2; 47/24
[58] Field of Search ............... 47/2, 22, 23, 24, 25, 47/26, 32, 30, 6, 7, 55, 44, 8; 428/317.1, 317.7, 316.6, 319.7, 447, 914, 480, 354, 343, 351, 356; 156/308.4; 204/30; 89/1.816; 381/204

[56] References Cited

U.S. PATENT DOCUMENTS

| | | | |
|---|---|---|---|
| Re. 29,039 | 11/1976 | Andrews | 204/30 |
| 2,719,100 | 9/1955 | Banigan | 156/308.4 |
| 3,333,361 | 8/1967 | Manak | 47/23 |
| 3,885,403 | 5/1975 | Spencer | 47/2 |
| 4,004,727 | 1/1977 | Rausing et al. | 428/316.6 |
| 4,244,156 | 1/1981 | Watts | 47/2 |
| 4,263,360 | 4/1981 | Adelman | 428/316.6 |
| 4,341,039 | 7/1982 | Reese | 47/2 |
| 4,360,984 | 11/1982 | Ruttenberg | 428/317.1 |
| 4,426,909 | 1/1984 | Carter | 89/1.816 |
| 4,533,577 | 8/1985 | Mier | 428/316.6 |
| 4,568,600 | 2/1986 | Omo et al. | 428/447 |

FOREIGN PATENT DOCUMENTS

| | | | |
|---|---|---|---|
| 444859 | 10/1912 | France | 47/2 |
| 968799 | 3/1965 | France | 47/2 |
| 2576748 | 8/1986 | France | 47/23 |
| 54-139084 | 6/1979 | Japan . | |
| 941562 | 11/1963 | United Kingdom | 47/7 |

OTHER PUBLICATIONS

Van Leer Plastics, 1 pg. leaflet on Valeron Film, Van Lear, P.O. Box 40159 Houston, Tex. 77740-0159.
Van Leer Plastics Capabilities, 4 pg. brochure, Materials Processes Unique Properties Performance Benefits.

Primary Examiner—Danton D. DeMille
Attorney, Agent, or Firm—Connolly and Hutz

[57] ABSTRACT

Sheet of yieldable plastic foam, suitably supported by laminating to support film, or by providing an unfoamed skin on its surface makes an effective protective wrap for trees and for metal coils. Young orange trees can have trunks wrapped with many turns of very yieldable thick foam sheet treated to prevent the passage of radiant energy as by a metallized polyethylene terephthalate support film, provides very effective protection against freeze damage. Only one or two turns of thinner laminate protects grape arbors against undesired budding in winter. Foam backed with cross-tensilized polyethylene sheets provides excellent protective covering for metal coils.

3 Claims, 1 Drawing Sheet

PROTECTIVE WRAPPING

The present invention relates to the protection of trees, particularly citrus trees and grape arbors.

Among the objects of the present invention is interfering with natural influences which can damage a tree or cause improper growth.

Additional objects of the present invention include the provision of novel wrapping material with which to wrap a portion of a tree to be protected.

The foregoing as well as still further objects of the present invention will be more fully understood from the following description of several of its exemplifications, reference being made to the accompanying drawings wherein.

The citrus fruit industry in certain geographic locations is threatened by the occasional subjection to subfreezing weather which not only damages fruit not yet harvested, but also damages the citrus trees themselves. A tree thus damaged and needing replacement is a total and expensive loss, particularly when the tree is young. On the other hand, freeze damage to the fruit itself can be of relatively minor significance.

According to one aspect of the present invention, a citrus tree having a trunk at least about 17 millimeters thick has its trunk protected by an encircling wrap of a yieldable plastic foam sheet, the thickness of the sheet being greater than about 2 centimeters and not over about 3 centimeters, the number of turns of the wrap being from about 6 to about 15, the yieldability of the foam being such that it is compressed by the wrapping to essentially fill in the space at the end of the first turn where the foam sheet extends from the trunk surface to the outer face of the interior edge of the sheet, and the sheet does not permit the passage of significant radiant energy.

The wrapping foam is preferably laminated to a backing layer or has one of its surfaces unfoamed or melted to form an unbroken skin that supports and strengthens the foam against mechanical abrasion and other forces.

A particularly effective backing layer is a film of polyethylene terephthalate about ½ to about 1 mil thick. This can be laminated to the foam sheet using as a laminant amorphous polypropylene or any of the other laminants disclosed in PCT application Ser. No. US86/01731 filed Aug. 20, 1986, published Feb. 26, 1987 under No. WO87/01092. Alternatively, the foam can be formed on the backing layer and adheres to that layer by reason of the normal adhesion of the foam-forming mixture.

A polyethylene terephthalate backing film is very effectively used to block the passage of radiant energy to the wrapped tree trunk, by applying a metallized layer to one or both surfaces of the film. Such metallized layer should have reflectivity of at least about ⅔ for radiant energy, and preferably has reflectivity of at least about 75%, particularly if the metallized layer is on only one face of the backing film. Aluminum is the metal of choice for such metallizing.

By using at least about six turns of the foam laminate to wrap an orange tree trunk, the action of the metallized layer in blocking radiant energy is geometrically multiplied, so that essentially no such energy penetrates all six layers even when as much as ⅓ of the impinging energy succeeds in penetrating through the outside layer.

The foam layer can be colored to also block the passage of radiant energy. Only about ½ to about 1% content of carbon black or of dark dyes or other pigments is enough to block essentially all energy penetration through a six-layer wrap of such colored foam, whether or not it is laminated to a backing sheet, and whether or not such backing sheet is metallized.

Figure 1:
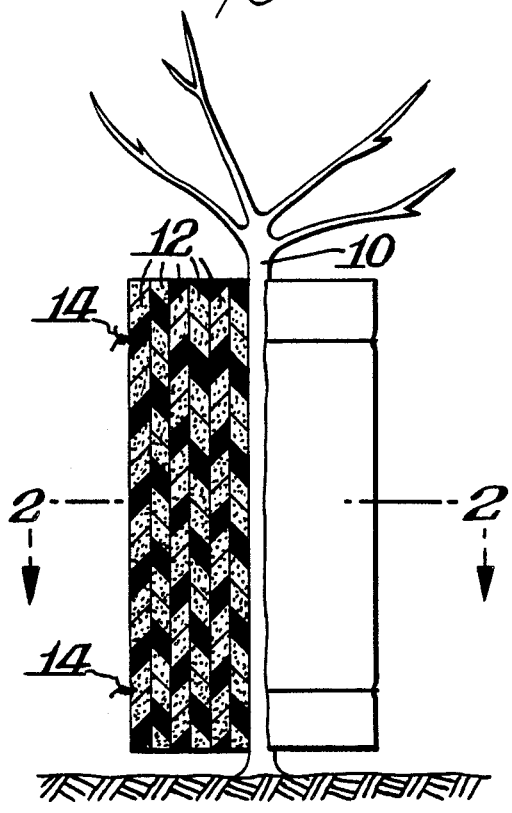
FIG. 1 is an elevational view partly in sections of an orange tree protected pursuant to the present invention.
Figure 2:
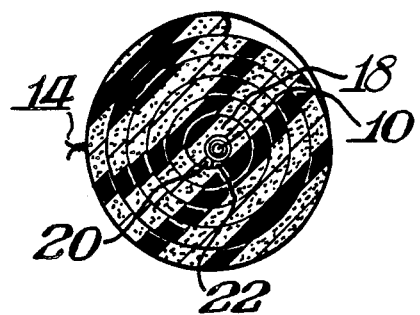
FIG. 2 is a sectional view of FIG. 1, taken along line 2—2.

The foam layer should be sufficiently resilient that it squeezes into all spaces at the tree trunk surface. FIGS. 1 and 2 show a typical citrus tree wrap in which the trunk 10 of the tree is wrapped with six to fifteen turns of a plastic foam sheeting 12, held in place by encircling ties 14 of plastic or metal or of plastic-coated metal. The innermost turn 18 of the foam sheeting has a leading edge 20 which must be spanned by the sheeting, and normally, a gap 22 is formed as the next turn of the wrap extends from the tree surface to the outer face of leading edge 20. However, the foam sheeting 12 is made highly yieldable, as by having its foam of open-celled flexible structure and a density no greater than about 20% that of the unfoamed plastic. Under these conditions the wrapping and tying of the foam sheet in place is enough to squeeze the foam into space 22, thus leaving no significant residual space through which cold air surrounding the tree can penetrate into the wrapped portion of the trunk.

The yieldable wrap also seals against irregularities in the surface of the wrapped trunk, and permits that trunk to readily expand as the tree grows.

The plastic used to make foam sheet 12 can be of any kind that provides the desired yieldability. Polyurethane plastics are very effective, as are polypropylene, polyethylene and polystyrene plastics. Most inexpensive yieldable plastics are not sufficiently resistant to mechanical abrasion or the deteriorating effects of the weather, and are thus best protected by a strong weather-resistant backing sheet such as polyethylene terephthalate or polyacrylate or polypropylene film or tensilized polyethylene film, loaded with antioxidants and other weather-resistant ingredients.

It is preferred to wrap a 3 to 4 feet height of the tree trunk.

Figure 3:
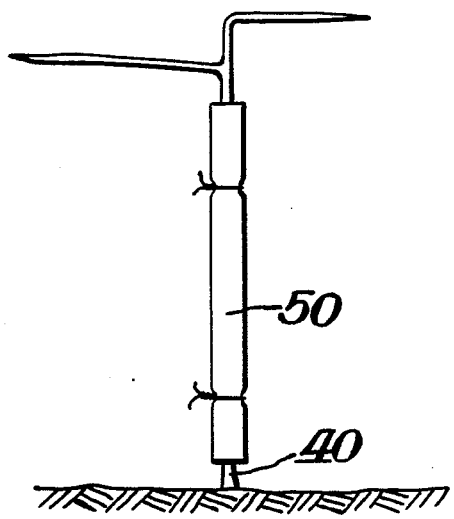
FIG. 3 is an elevational view of a grape arbor bush protected pursuant to the present invention.

FIG. 3 illustrates another aspect of the invention in which a grape arbor or bush 40 is protected by a wrap 50. Grapes are generally grown where a warm winter sun can start buds forming on the trunk, where they are not wanted. A single turn of protective wrap 50, or as much as a turn and a half, if sufficiently blocking toward sunlight, accordingly provides important protection.

A wrap which is a laminate of ⅛ to ¼ inch thick yieldable foam secured to a reflective barrier film such as metallized polyethylene terephthalate does a good job, whether the metallizing is on the outer or inner surface of the film, or on both of those surfaces. Because of the small number of wrapping turns, it is preferred that the reflectivity of the metallized layers be at least about 80%, unless the foam is filled with light-blocking ingredients such as dyes, carbon black and other pigments.

The thickness of the backing layer need only be enough to provide the desired overall strength and abrasion resistance. Only about ½ mil thick polyethylene terephthalate film is adequate, although such film can also be up to about 1 mil thick. Other backing sheets such as tensilized polyethylene should be at least about 1 mil thick and up to about 1.5 mil thick. Plastics such as polystyrene that are not as strong should be about 1.5 to about 3 mils thick.

The thickness of the foam layer in wrap 50 should be enough to seal against variations in the surface of the grape bush trunk. In many cases, ⅛ inch is an adequate thickness, but ¼ inch thickness is generally adequate in all instances. The yieldability of this foam need not be as great as that of the foam in FIG. 1, so that wrapper 50 can have its foam of closed-cell or open-cell construction. That foam can be made of any of the plastics described in connection with FIG. 1.

Also, the backing sheet for sheet 50 can be replaced by a skin of unfoamed plastic on the outer surface of the foam, as also described in connection with FIG. 1.

Figure 4:
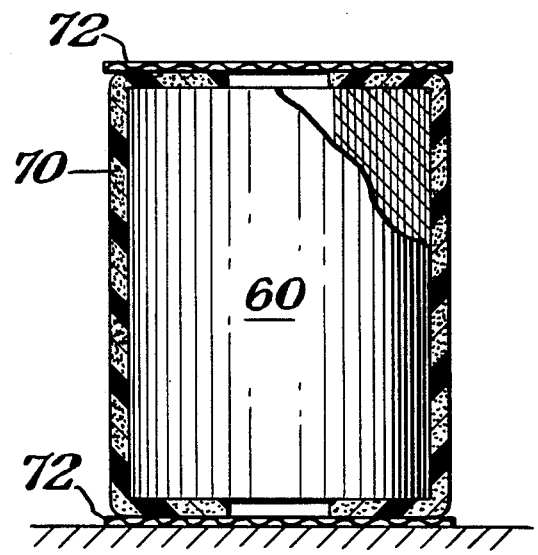
FIG. 4 is an elevational view, partly in section, of a coil of sheet metal protected pursuant to the present invention.

FIG. 4 illustrates yet another aspect of the present invention. Here, a coil 60 of sheet tinplate, for example, is wrapped in a protective laminate 70 which covers the sides and is folded over the upper and lower edges of the sheet tinplate. Corrugated cardboard discs 72 can be cemented over the top and bottom folds to add more cushioning. One turn of the laminate wrapping 70 is enough, but an additional turn or an additional half-turn can also be used. The free outer end of that wrap can be tied or cemented into place.

Figure 5:
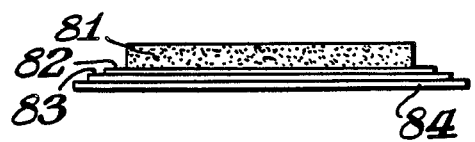
FIG. 5 is a detailed view of the protective wrapper in FIG. 4.

The composition of wrapper 70 is more fully illustrated in FIG. 5. It is made of a layer of foam 81 laminated to a layer of paper 82 which in turn is laminated to layers 83, 84 of tensilized polyethylene. The foam layer is preferably of closed-cell construction and about 1/32 to about ⅛ inch thick, preferably 1/16 inch thick, to resist and cushion against the relatively strong stresses associated with the handling of metal coils that can each weigh over 500 pounds. The foam need not be as resilient as the foams of FIGS. 1 and 3, but should not be rigid. A polypropylene closed-cell foam having a density about ⅛ to 1/5 the density of the unfoamed polypropylene is quite satisfactory, although many other foamed plastics can be used as shown in connection with FIGS. 1 and 3.

The paper sheet can be a 25 to 35-pound Kraft paper, preferably 30-pound Kraft paper, laminated to the foam with any of the pressure-sensitive or other laminants described in PCT application US86/01731.

The polyethylene sheets 83 and 84 are tensilized at right angles to each other and are accordingly extremely resistant to puncture. They are laminated to the paper layer and to each other, preferably with a pressure-sensitive laminant, and can have an overall thickness of about 2 to about 3 mils, preferably 2.5 mils. It is also preferred that both of these polyethylene sheets have about the same thickness plus or minus about 20%.

The paper layer 82 can be omitted from the wrapper 70, but its presence makes it simpler to laminate all the layers together.

The combination of FIG. 4 is also very effective for protecting other metals such as aluminum, blackplate, plain steels, copper and brasses, and even stainless steels or other sheet metal that needs a cushioning wrap. Where the wrapped metal is corrodible, the face of the foam layer 81 can be coated with a volatile corrosion inhibitor ("VCI") as described in U.S. Pat. No. 4,321,297, as well as in the above-cited PCT application.

The metal that is packaged also be in the form of pre-cut sheets or stampings stacked for shipment in bundles.

To simplify the wrapping, the edge portions of the wrap which are folded over the top and bottom of the package can have their faces pre-coated with cement such as the cohesive-nonadhesive cement of U.S. Pat. No. 4,086,384 or of the PCT application or contact cement, so the folded-over portions seal against each other. The cardboard protector disc, or any other protector disc can be similarly pre-coated or can be placed under the folds of the wrap so the sealing of the folds to each other will also hold the protector disc in place.

Obviously, many modifications and variations of the present invention are possible in the light of the above teachings. It is, therefore, to be understood that within the scope of the appended claims the invention may be practiced otherwise than as specifically described.

What is claimed is:

1. In the process of protecting a citrus tree against freezing weather by wrapping its trunk, the improvement according to which the wrap is a plurality of turns deep of a yieldable plastic foam sheet which is more than about 2 centimeters and not over about 3 centimeters thick and laminated to a tensilized polyethylene film loaded with weather-resistant ingredients, the wrapping is subjected to compression so it essentially fills in the space at the end of the first turn where the foam sheet extends from the trunk surface to the outer face of the interior edge of the sheet, and the laminate contains means preventing the passage of significant radiant energy through the turns.

2. A protective wrap encircling a citrus tree having a trunk at least about 17 millimeters thick, the wrap being a plurality of turns deep of a yieldable plastic foam sheet laminated to a tensilized polyethylene film loaded with weather-resistant ingredients, the thickness of the sheet being greater than about 2 centimeters and not over about 3 centimeters, the yieldability of the foam being such that it is compressed by the wrapping to essentially fill in the space at the end of the first turn where the foam sheet extends from the trunk surface to the outer face of the interior edge of the sheet, and the laminate contains means preventing the passage of significant radiant energy through the turns.

3. The combination of claim 2 in which the foam in the foam sheet is open-celled.

* * * * *